(12) United States Patent
Hsiao et al.

(10) Patent No.: US 10,373,292 B2
(45) Date of Patent: Aug. 6, 2019

(54) METHOD AND SYSTEM FOR PROVIDING HIGH RESOLUTION IMAGE THROUGH SUPER-RESOLUTION RECONSTRUCTION

(71) Applicant: UMBO CV INC., Taipei (TW)

(72) Inventors: Pai-Heng Hsiao, Taipei (TW); Ping-Lin Chang, Taipei (TW)

(73) Assignee: UMBO CV INC., Taipei (TW)

( * ) Notice: Subject to any disclaimer, the term of this patent is extended or adjusted under 35 U.S.C. 154(b) by 79 days.

(21) Appl. No.: 15/805,197

(22) Filed: Nov. 7, 2017

(65) Prior Publication Data

US 2018/0137603 A1 May 17, 2018

(30) Foreign Application Priority Data

Nov. 7, 2016 (TW) .............................. 105136158 A (51) Int. Cl.
*G06T 3/40* (2006.01)
*G06T 7/13* (2017.01)
*G06T 7/90* (2017.01)
*H04N 19/44* (2014.01)

(52) U.S. Cl.
CPC .............. *G06T 3/4053* (2013.01); *G06T 7/13* (2017.01); *G06T 7/90* (2017.01); *H04N 19/44* (2014.11); *G06T 2207/10024* (2013.01); *G06T 2207/20016* (2013.01); *G06T 2207/20076* (2013.01)

(58) Field of Classification Search
CPC ........... G06T 3/4053; G06T 7/13; G06T 7/90; H04N 19/44
See application file for complete search history.

(56) References Cited

U.S. PATENT DOCUMENTS

2018/0060722 A1* 3/2018 Hwang ................ G06N 3/0454
2018/0139458 A1* 5/2018 Wang ..................... H04N 19/33
2018/0300855 A1* 10/2018 Tang ...................... G06T 3/4053

OTHER PUBLICATIONS

Huang et al, "Bidirectional Recurrent Convolutional Networks for Multi-Frame Super-Resolution", 2015, Advances in Neural Information Processing Systems, 9 pages (Year: 2015).*
Kappeler et al, "Video Super-Resolution With Convolutional Neural Networks", Jun. 2016, IEEE Transactions on Computational Imaging, vol. 2, No. 2, pp. 109-122 (Year: 2016).*
Yang, "Sparse Modeling of High-Dimensional Data for Learning and Vision", 2011, Doctoral dissertation, University of Illinois at Urbana-Champaign, 129 pages (Year: 2011).*

* cited by examiner

*Primary Examiner* — David F Dunphy
(74) *Attorney, Agent, or Firm* — Bacon & Thomas, PLLC (57) ABSTRACT

A system and method for providing high resolution image through super-resolution reconstruction. The system comprises a frame buffer, a convolutional neural network module, an image processing module, and a bi-directional prediction module. After the frame buffer has received high-resolution image with low frames per second and low-resolution image with high frames per second, both are captured by an image capturing module, image processing with super-resolution reconstruction can be performed through the cooperation of the convolutional neural network module, the image processing module and the bi-directional prediction module. In other words, a frame with super-resolution can be calculated through a well-trained convolutional neural network.

23 Claims, 10 Drawing Sheets

$$\begin{pmatrix} X_{22} & X_{23} & X_{24} & X_{25} & 0 \\ X_{32} & X_{33} & X_{34} & X_{35} & 0 \\ X_{42} & X_{43} & X_{44} & X_{45} & 0 \\ X_{52} & X_{53} & X_{54} & X_{55} & 0 \\ 0 & 0 & 0 & 0 & 0 \end{pmatrix} = \begin{pmatrix} X_{11} & X_{12} & X_{13} & X_{14} & X_{15} \\ X_{21} & X_{22} & X_{23} & X_{24} & X_{25} \\ X_{31} & X_{32} & X_{33} & X_{34} & X_{35} \\ X_{41} & X_{42} & X_{43} & X_{44} & X_{45} \\ X_{51} & X_{52} & X_{53} & X_{54} & X_{55} \end{pmatrix} * \begin{pmatrix} 0 & 0 & 0 \\ 0 & 0 & 0 \\ 1 & 0 & 0 \end{pmatrix}$$

METHOD AND SYSTEM FOR PROVIDING HIGH RESOLUTION IMAGE THROUGH SUPER-RESOLUTION RECONSTRUCTION

BACKGROUND OF INVENTION

Field of the Invention

The present invention relates to a method and system for providing high resolution image through super-resolution reconstruction, which can be applied to an image monitoring system to solve problems of image distortion and limited upload bandwidth.

Brief Description of Prior Art

In conventional image monitoring system, an image file recorded by image capturing device is performed with image compression, then the image file is transmitted to user terminal device after being decompressed by a cloud server, so that users can perform real-time monitoring on information of each monitoring point so as to reach the purpose of real-time streaming. Simultaneously, the cloud server can store a number of image files captured by the image capturing device. If user wants to read non-concurrent file, he should link the user-end terminal device to the cloud server so as to reach the purpose of on-demand streaming. However, if user wants to have better picture fluency and more image detail information, it is bound to raise the image resolution and the frames per second (FPS). This tends to increase image file capacity, and thus to place bigger burden on cloud server storage space and buffer. To the most widely used broadband technology—Asymmetric Digital Subscriber Line (ADSL), the upload speed in different communication standards and in ADSL of different countries has very large difference. Under the limitation of limited upload bandwidth, if the number of image capture devices is large and the image capturing device simultaneously uploads multiple high-resolution images with high FPS, big burden will be placed upon the storage space of the cloud server and the buffer, and this may moreover cause bad fluency in real-time playback. Accordingly, users can only improve the playback smoothness and reduce the burden on the cloud server by reducing image file resolution, picture frames per second, and compression bit rate. Although the existing encoding compression technology can be used with upload bandwidth limit of the image capturing device, but in order to take into account the needs of real-time streaming at the same time, the encoding compression technology must be a destructive compression. As a result, the image quality of the user terminal device is absolutely affected. Therefore, how to take both the image size of the uploaded bandwidth limit and the file size of the captured image file into consideration, and also to enhance the image quality of the compressed image file are problems to be solved. Accordingly, a solution of super-resolution reconstruction method is proposed.

According to image processing quantity, the super-resolution image reconstruction method can be divided into "super-resolution reconstruction method of single image" and "super-resolution reconstruction method of multiple images". The super-resolution reconstruction method of a single image refers to the use of a single low-resolution image to reconstruct a high-resolution image. In simple terms, the low-resolution image is more ambiguous due to its lack of edge information, so how to estimate the edge information of the low resolution image so as to reconstruct the high resolution of the ultra-resolution image is its key technical means. For example, the application of traditional high-pass filter in the Bayesian maximum posteriori probability estimation method (Maximum A Posteriori). While in the case of "super-resolution reconstruction method of multiple images", a high-resolution image with less noise and more detail is reconstructed by capturing and fusing the eigenvalues difference between each of the low-resolution images, which are taken in a series of shooting in the same scene with pixels displacement present between each image or with other eigenvalues. However, the high resolution image reconstructed by this super-resolution reconstruction method often has image distortion problems such as Ill-Posed and Jaggies, so the image quality of the super-resolution image reconstructed from multiple low-resolution images still has to be improved.

Furthermore, another super-resolution reconstruction method has been proposed to interpolate multiple images with low-resolution images (such as double-cubic interpolation, double-triple interpolation) to high-resolution images, such as the method disclosed in U.S. Pat. Publication No. 811,774B1 in which at least two low-resolution images are interpolated into a high-resolution image to obtain an estimated high-resolution image, and then the super-resolution module produces a super resolution image according to the estimated high resolution image and at least two low resolution images. Furthermore, as disclosed in Taiwanese Patent No. TWI488144B, a plurality of low-resolution images and a high-resolution image, after a plurality of interpolation, are turned into a final low-resolution image and a residual image separately, and then both are assembled into an improved high-resolution image. However, the super-resolution images produced in abovementioned prior arts still have image distortion problem and the Peak signal-to-noise ratio (PSNR) is not high enough. What's more, it is not proposed how the image capturing device should have to capture the desired image so as to solve the problems of the storage space and limited upload bandwidth.

How to take the cloud server storage space size, buffer size, networking speed and image quality into consideration simultaneously so as to provide an appropriate method and system for providing high resolution image through super-resolution reconstruction is a problem to be solved.

SUMMARY OF INVENTION

The system and method for providing high resolution image through super-resolution reconstruction of the present invention. In the present invention, the system comprises a frame buffer, a convolutional neural network module, an image processing module, and a bi-directional prediction module. The frame buffer can receive high-resolution images with low FPS and low-resolution images with high FPS, and image processing with super-resolution reconstruction can be performed through the convolutional neural network module, the image processing module and the bi-directional prediction module so that a frame with super-resolution is calculated out and transmitted to user terminal device sequentially for user to view a monitored image. In the present invention, the convolutional neural network module is used as the selection mechanism and the image processing mechanism of the image candidate sample in the super-resolution reconstruction method. As a result, since the convolutional neural network module has been continuously trained and learned, it can capture more accurate image details, so that the image monitoring industry, with lower setting cost of hardware and software, not only can enhance effective image quality improvement and operational efficiency but also can solve the problems of image distortion, upload bandwidth limit of the image capturing device, and limitation on the storage space and buffer existed in conventional super-resolution reconstruction method.

DETAILED DESCRIPTION OF PREFERRED EMBODIMENTS

Figure 1:
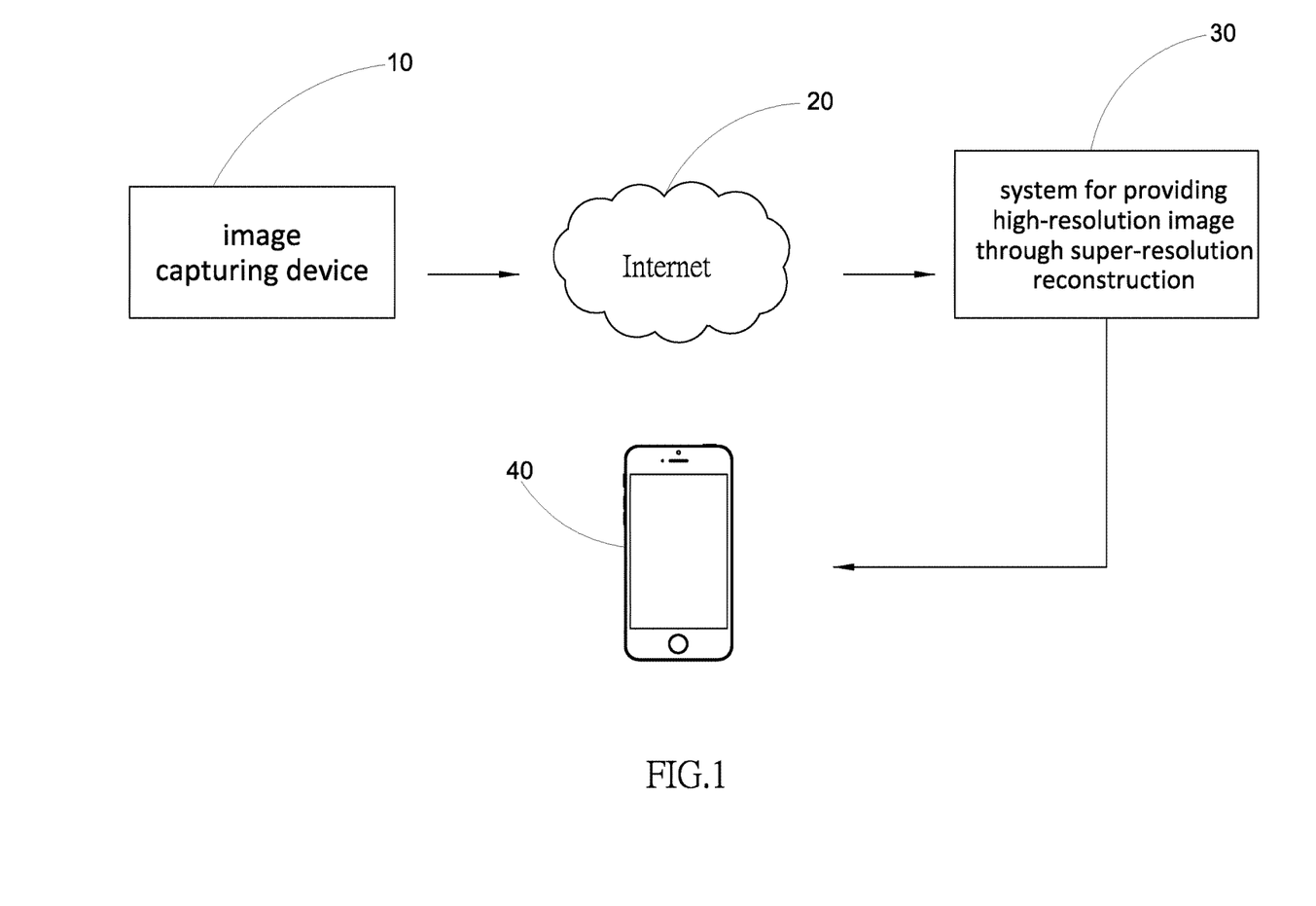
FIG. 1 is a system structural view of the present invention.

Referring to FIG. 1, a system 30 for providing high-resolution image through super-resolution reconstruction method can establish a data linking with an image capturing device 10 and an user terminal device 40 separately via internet 20, and the image capturing device 10 may capture a high-resolution image file and a low-resolution image file and transmit these files to the system 30 for generating a high-resolution image through super-resolution reconstruction method so as to buffer, store, and perform super-resolution reconstruction image processing. Further, the high-resolution image file captured by the image capturing apparatus 10 may have a FPS smaller than or equal to that of the low-resolution image file. After the system 30 for providing high-resolution image through super-resolution reconstruction method has completed the super-resolution reconstruction image processing, a super-resolution frame with high FPS and high resolution is generated, and is transmitted to the user terminal device 40 after buffering and encoding, so that user can view a monitored image with super-resolution image quality. In addition, the system 30 for generating high-resolution image by super-resolution reconstruction method may store a plurality of image files captured by the image capturing apparatus 10, so that user terminal device 40 can enjoy the function of on-demand streaming, in other words, the user terminal device 40 can view a non-concurrent monitored image.

Figure 2:
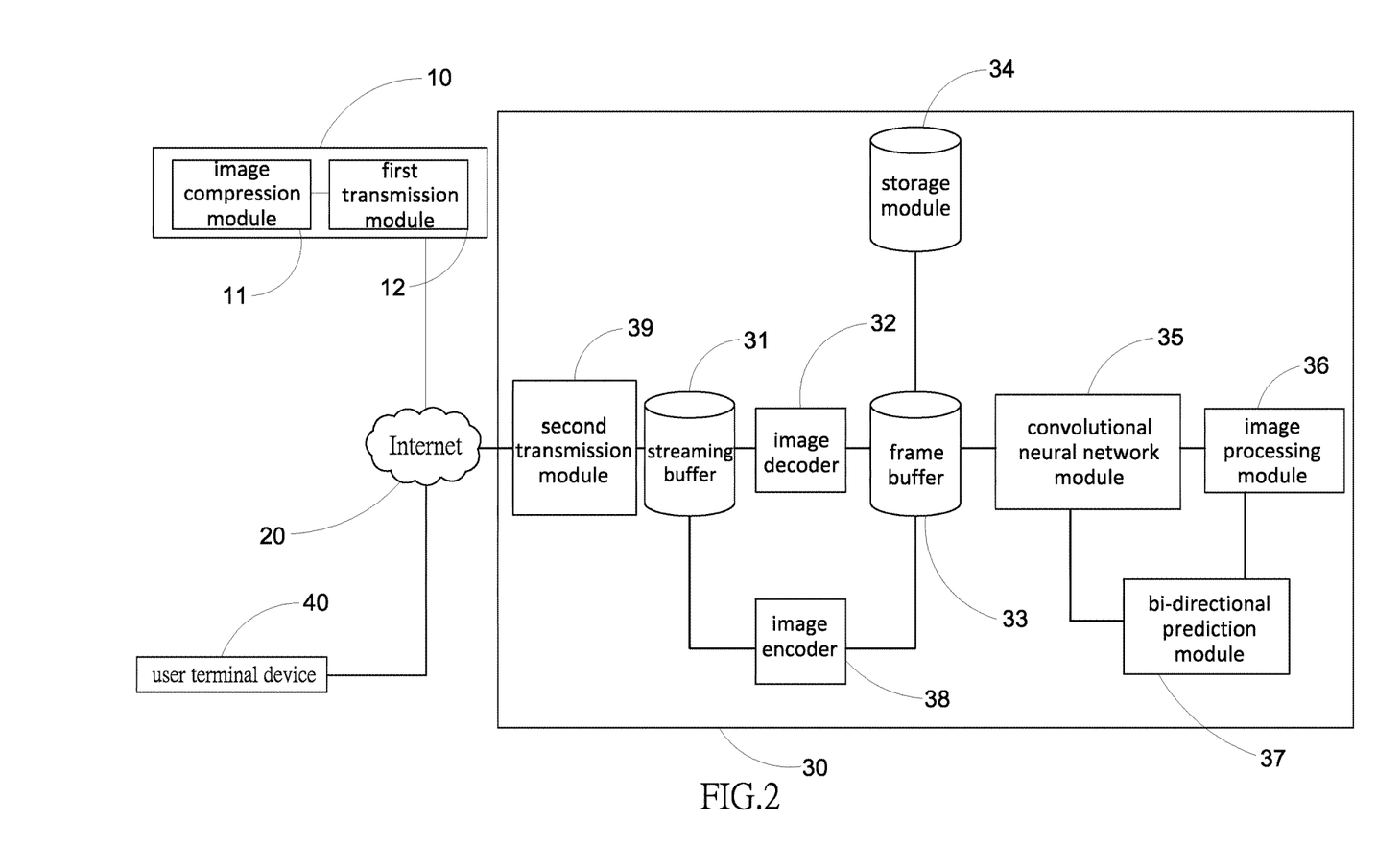
FIG. 2 is a system composition view (I) of the present invention.

According to FIG. 2, after the system 30 for generating high-resolution image by super-resolution reconstruction method has established data linking with the image capturing device 10, it can receive a plurality of high-resolution frames with lower FPS and a plurality of low-resolution frames with higher FPS captured by the image capture device 10, and the number of frames captured by the image capturing device 10 is determined according to the number of samples T. For example, if T=2, the image capturing device 10 captures a high resolution frame and a low resolution frame; if T=5, the image capturing device 10 captures one high resolution frame and four low-resolution frames; in other words, the number of samples (T value) determines the number of frames captured continuously by the image capturing device 10 and at least one of the frames captured by the image capturing device 10 is a high-resolution frame. In a preferred embodiment, only one high-resolution frame is present in the frame captured by the image capturing device 10 and the remaining frames are low-resolution frames. Whereby, the problem of limited storage space and limited upload bandwidth of the image capturing device 10 can be solved. Thereafter, when the previous frames are captured by the image capturing device 10, the frames are processed with image compression by the image compression module 11. The image compression module 11 reduces the image file size by lowering the bit rate, and the compression types employed in the image compression module 11 include: M-JPEG, WMV, H.264 and other Lossy Compression format, and for example, and other Lossless Compression format such as Huffyuv. In addition, current online streaming platform is mainly destructive compression. When image compression is performed by the image compression module 11, the image file is transmitted by the first transmission module 12. The first transmission module 12 can be Wi-Fi, HSUPA or LTE transmission modules etc. Also, according to online streaming principle, the file is divided into a plurality of packets by the transmitting end and is transmitted to the receiving end. Therefore, the previous frames after image compression by the image compression module 11 can be divided into a plurality of packets in advance and are then transmitted by the first transmission module 12 to the system 30 for providing high resolution image through super-resolution reconstruction. By lowering the file size of the image captured by the image capturing device 10, the problem that only lower resolution frame can be captured due to limited upload bandwidth of the first transmission module 12 of the image capturing device 10 can be solved.

Referring to FIG. 2, the system 30 for providing high-resolution image through super-resolution reconstruction method comprises a streaming buffer 31, an image decoder 32, a frame buffer 33, a storage module 34, a convolutional neural network module 35, an image processing module 36, a bi-directional prediction module 37, an image encoder 38, and a second transmission module 39. When the system 30, providing high-resolution image through super-resolution reconstruction method, receives a plurality of packets transmitted by the first transmission module 12, the system 30 temporarily stores the packets in the streaming buffer 31, and the streaming buffer 31 is further in data linking with the image decoder 32 for decompressing the above plurality of packets, and then decoding the above frames. Thereafter, the image decoder 32 is re-linked to the frame buffer 33 to temporarily store the above frame in the frame buffer 33, and the frame buffer 33 is re-linked to the storage module 34 to store the decoded, monitored images which need not long-term storage. Also, in a preferred embodiment, the streaming buffer 31 may be directly linked to the storage module 34 to store frames, which are not decoded yet and need long term storage, in the storage module 34 so as to save storage space effectively. The storage module 34 may be an SSD, an HDD, an eMMC, or an eMCP, etc. When the frame buffer 33 receives the decoded previous frame, it can be linked with the convolutional neural network module 35 and transmits the decoded frames to the convolutional neural network module 35. Next, the convolutional neural network module 35 is in data linking with the image processing module 36 and the bi-directional prediction module 37 separately, so as to perform super-resolution reconstruction image processing on the frames captured by the image capturing device 10. Before performing the super-resolution reconstruction image processing, with respect to the high-resolution frame (For example, 1920×1080 pixels, and the pixel is the basic unit of the image display) and the low resolution frame (e.g., 320×180 pixels), the image processing module 36 can enlarge the low-resolution frame (320×180 pixels) to the same size as the high-resolution frame (such as 1920×1080 pixels) through interpolation method such as nearest-neighbor interpolation, bilinear interpolation, bicubic interpolation and other interpolation, and then successfully calculate out a super-resolution frame, and the super-resolution frame is temporarily stored in the frame buffer 33. Thereafter, the image encoder 38 encodes the super-resolution frame and temporarily stores it in the streaming buffer 31. Finally, the streaming buffer 31 is in data linking to the second transmission module 39 provided in the system 30 for generating high-resolution image through super-resolution reconstruction method so as to transmit the super-resolution frame to the user terminal device 40. The user terminal device 40 may be a smartphone, PC, laptop, tablet. In addition, the packet transmission order of the first transmission module 12 can be either progressive streaming or real time streaming.

Figure 3:
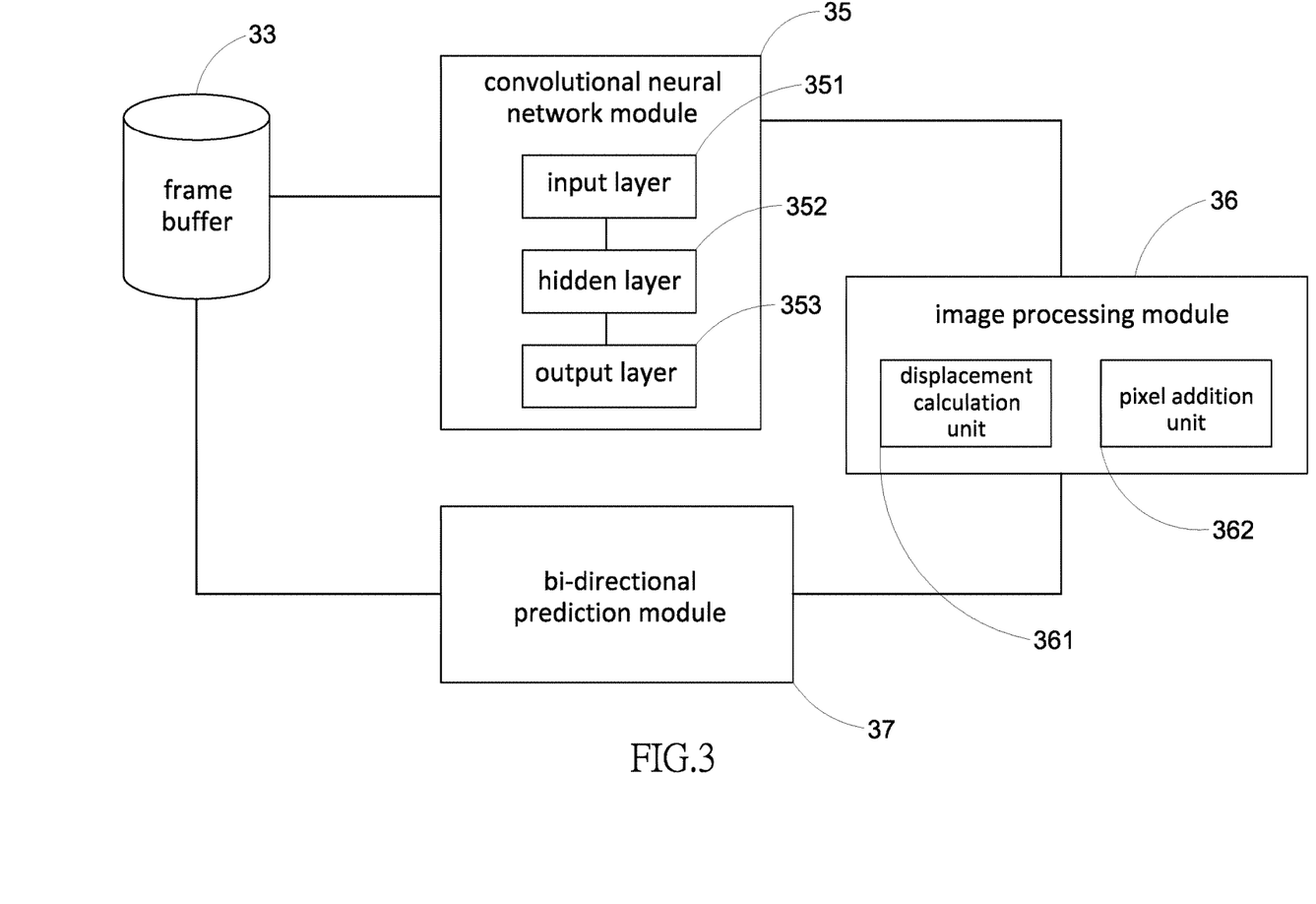
FIG. 3 is a system composition view (II) of the present invention.

Referring to FIG. 3, the frame buffer 33 establishes data linking with the convolutional neural network module 35; the convolutional neural network module 35 and bi-directional prediction module 37 can be in data linking to the image processing module 36 respectively. The convolutional neural network module 35 includes an input layer 351, at least one hidden layer 352, and an output layer 353. The input layer 351 is for inputting a frame or a residual value which is to be performed with convolution operations; the hidden layer 352 is used to store a plurality of parameters for determining pixel filtering unit (or convolution kernel) of convolution operation performed by the convolutional neural network module 35; the output layer 353 is used to output the convolution operation result. The image processing module 36 has a displacement calculation unit 361, and a pixel addition unit 362. The displacement calculation unit 361 calculates a pixel displacement quantity so as to reduce the difference in displacement quantity generated by each successive frame, and then filters out the pixel set having a smaller pixel displacement quantity with the low resolution frame; the pixel addition unit 362 is used to perform a pixel addition operation so as to separately generate frames which can be received by the bidirectional prediction module 37. The bi-directional prediction module 37 is employed to receive a forward prediction high resolution frame and a reverse prediction high resolution frame of the same time point for the convolutional neural network module 35 to perform at least one convolutional operation so as to calculate out a super-resolution frame.

Figure 4:
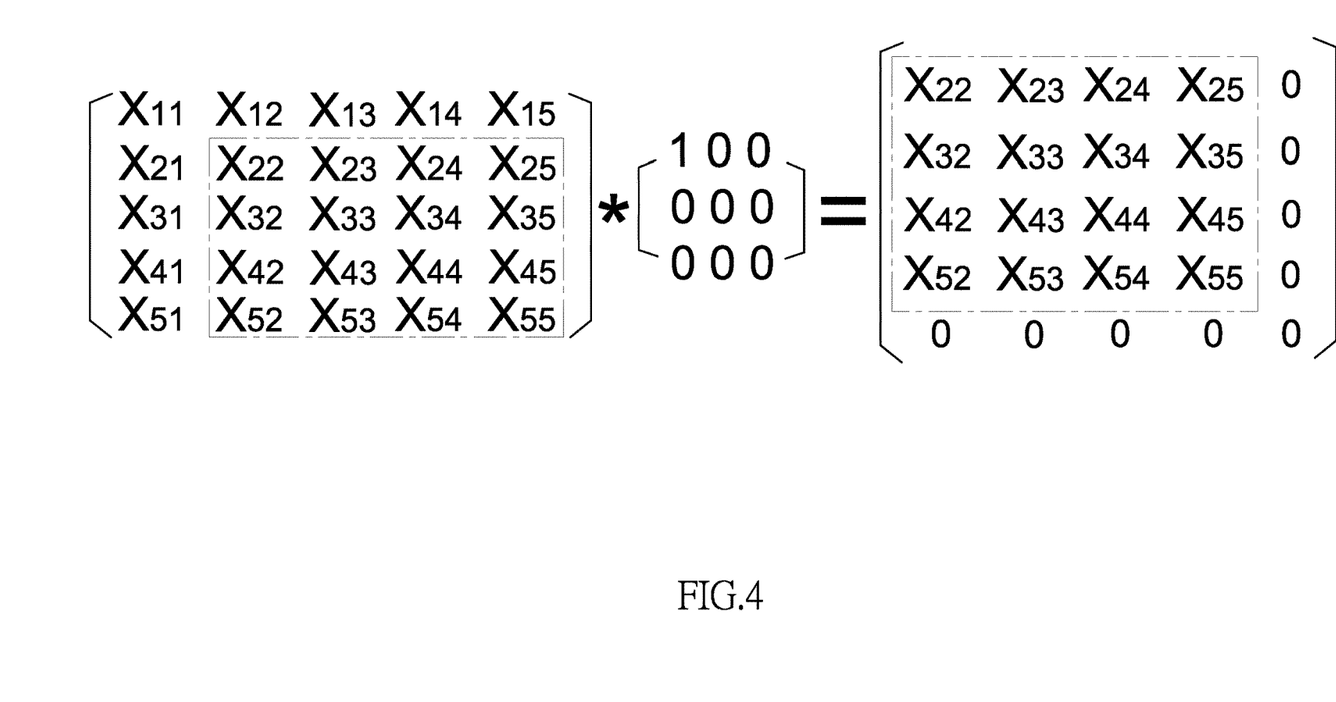
FIG. 4 is a schematic view of a set of candidate high resolution pixels produced in the present invention.

Referring to FIG. 4, a high-resolution frame with 5×5 pixels is performed with convolutional operation by using a 3×3 convolutional kernel, and a candidate high resolution pixel set with 5×5 pixels can be calculated out. The result of the operation in the FIG. 4 is one frame in the candidate high-resolution pixel set. Therefore, it is known from the convolution operation that the purpose of the convolutional operation on the high-resolution frame is to capture $X_{22-25}$, $X_{32-35}$, $X_{42-45}$, and $X_{52-55}$ pixels, and the positions of the above pixels can be moved. It can be seen from above, the plurality of parameters stored in the hidden layer 352 of the convolutional neural network module 35 includes: for the forward prediction mode and the number of samples T=3, the input layer 351 can perform multiple convolution operations for a high resolution frame ($t^{th}$ frame) by using a different convolution kernel such as 3×3 pixels, 7×7 pixels, 15×15 pixels, or 31×31 pixels, so that the input layer 351 can calculate out a plurality of candidate high resolution pixel sets (served as $t+1^{th}$ frame) from the high resolution frame ($t^{th}$ frame). Thereafter, In order to reduce the number of candidate frames for each of the candidate high resolution pixel sets ($t+1^{th}$ frame), the input layer 351 may again perform simultaneously at least one convolution operation by using a smaller convolution kernel (preferably a 1×1 pixel convolution kernel) on each of the candidate high resolution pixel sets ($t+1^{th}$ frame), so as to generate a selected high-resolution pixel set ($t+1^{th}$ frame). In a preferred embodiment, from the pixel sets performed with convolution operation by the input layer 351 on each of the candidate high-resolution pixel sets ($t+1^{th}$ frame), the displacement calculation unit 361 may firstly select the pixel set having a smaller pixel displacement quantity with the low-resolution frame ($t+1^{th}$ frame) to serve as a selected high resolution pixel set ($t+1^{th}$ frame). On the other hand, in the case of reverse prediction mode, the input layer 351 may perform a plurality of convolution operations on a high-resolution frame ($t+3^{th}$ frame) by using different convolution kernels so that the input layer 351 can calculate out a plurality of candidate high resolution pixel sets (served as $t+2^{th}$ frame) from the high resolution frame ($t+3^{th}$ frame). Thereafter, the input layer 351 may again perform at least one convolution operation by using a smaller convolution kernel (preferably a 1×1 pixel convolution kernel) on the plurality of candidate high resolution pixel sets ($t+2^{th}$ frame). In a preferred embodiment, from the pixel sets performed with convolution operation by the input layer 351 on each of the candidate high-resolution pixel sets ($t+2^{th}$ frame), the displacement calculation unit 361 may firstly select the pixel set having a smaller pixel displacement quantity with the low-resolution frame ($t+2^{th}$ frame) to serve as a selected high resolution pixel set ($t+2^{th}$ frame).

Figure 5:
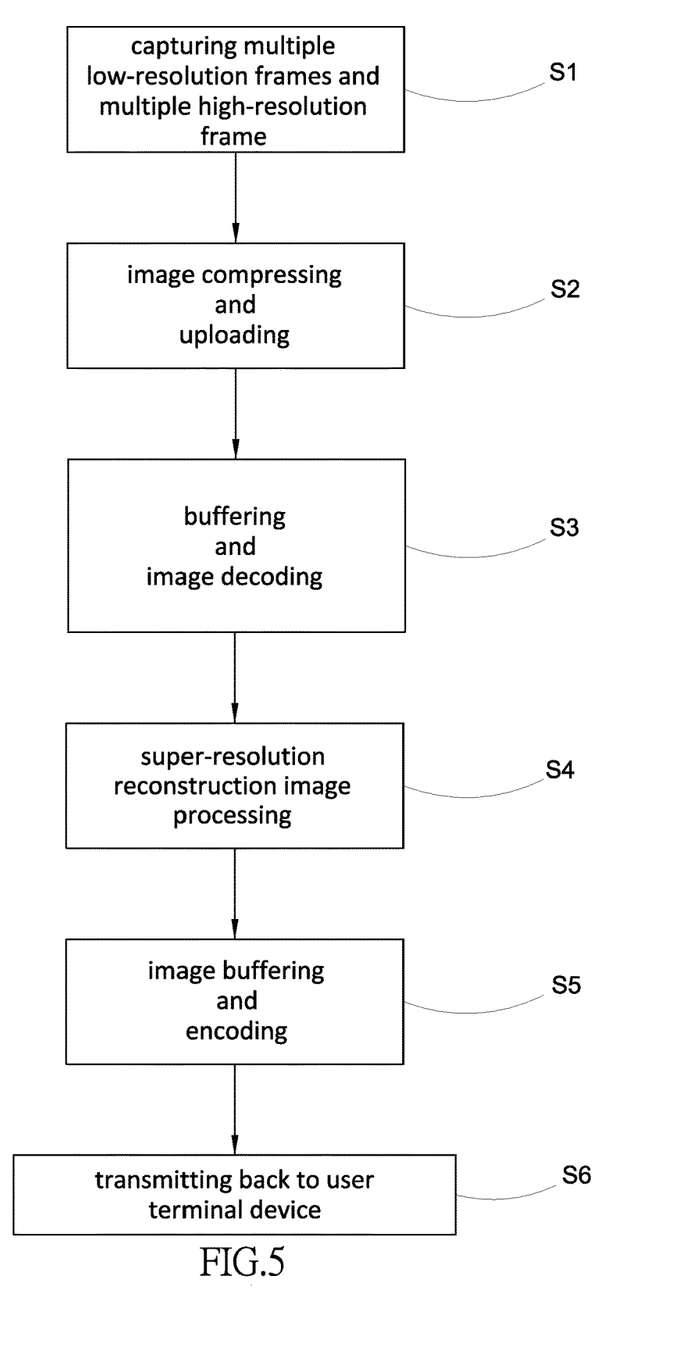
FIG. 5 is an implementation flow chart of the present invention (1)

Referring to FIG. 5, the implementation method of the present invention comprises the following steps:

(1) capturing a plurality of low-resolution frames and a plurality of high-resolution frames (step S1): if an user operating an user terminal device 40 wants to view a super-resolution image captured by the image capturing device 10 via the Internet 20, the image capturing device 10 simultaneously captures a plurality of high-resolution frames with lower FPS and a plurality of low-resolution frames with higher FPS, and the number of samples (hereinafter referred to as T Value) is used to determine the number of frames to be captured. For example, if t represents a high-resolution frame ($t^{th}$ frame) or a low-resolution frame and the T value (number of samples) is 3, then the image capturing device 10 captures a high-resolution frame ($t^{th}$ frame) and two low-resolution frames ($t+1^{th}$ frame, $t+2^{th}$ frame). When the image capturing device 10 finishes the capturing of above frames, the frames are transmitted to the image compression module 11 provided in the image capturing device 10 so as to perform image compression and uploading step S2;

(2) image compression and uploading (step S2): continuing from step S1, the image compression module 11 performs image compression on a plurality of high-resolution frames and a plurality of the low-resolution frames, and the compression types employed in the image compression module 11 includes: M-JPEG, WMV, H.264 and other Lossy Compression format and for example, Huffyuv and other Lossless Compression format. After image compression is completed by the image compression module 11, the image is transmitted via a first transmission module 12 provided in the image capturing device 10 to the system 30 for providing high resolution image through super-resolution reconstruction, and continue to perform buffering and image decoding of step S3;

(3) buffering and image decoding (step S3): continuing from step S2, when a second transmission module 39 provided in the system 30 for generating high-resolution image through super-resolution reconstruction method receives the above frames transmitted from the image capturing device 10, the above frames are temporarily stored in a streaming buffer 31 and are then transmitted to an image decoder 32 where the frames are decoded and decompressed to generate each of high-resolution frames and each of low-resolution frames, and these frames are temporarily stored in the frame buffer 33. Thereafter, when the system 30 for generating high-resolution image through super-resolution reconstruction method is ready to perform the super-resolution reconstruction image processing step S4, the frame buffer 33 transmits the high-resolution frames and the low-resolution frames to a convolutional neural network module 35;

(4) super-resolution reconstruction image processing (step S4): continuing from step S3, after the convolutional neural network module 35 receives the abovementioned frames transmitted by the frame buffer 33, the convolutional neural network module 35, the image processing module 36 and the bidirectional prediction module 37 cooperate to perform super-resolution reconstruction image processing, and a super-resolution frame is output by the convolutional neural network module 35. Before super-resolution reconstruction image processing is performed, with respect to the high-resolution frame (For example, 1920×1080 pixels) and the low resolution frame (e.g., 320×180 pixels), the image processing module 36 can firstly enlarge the low-resolution frame (320×180 pixels) to the same size as the high-resolution frame (such as 1920×1080 pixels) through interpolation method such as nearest-neighbor interpolation, bilinear interpolation, bicubic interpolation and other interpolation, and then perform super-resolution image processing;

(5) image buffering and encoding (step S5): continuing from step S4, when the convolutional neural network module 35 outputs a super-resolution frame, it is temporarily stored in the frame buffer 33 and is then encoded and buffered separately by the image encoder 38 and the streaming buffer 31, thereafter, is transmitted to a second transmission module 39;

(6) transmitting back to user terminal device (step S6): continuing from step S5, when the second transmission module 39 receives each of the super-resolution frames, it is transmitted to the user terminal device 40 by the mode of progressive streaming or real time streaming so that user at monitor end can view a super-resolution image with higher resolution and with more abundant in the detail of picture frame.

Figure 6:
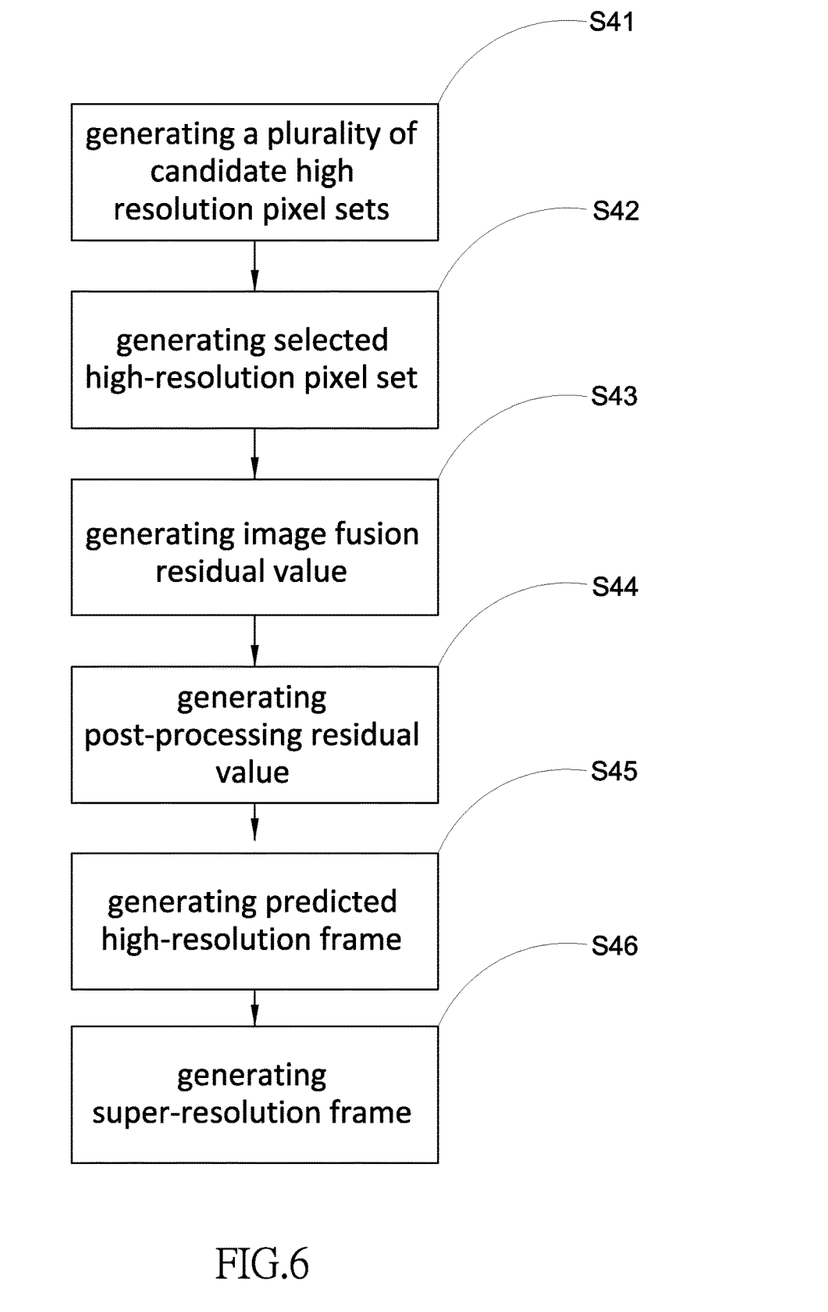
FIG. 6 is an implementation flow chart of the present invention (2)

Referring to FIG. 6, super-resolution reconstruction image processing step S4 includes the following steps:

(1) generating a plurality of candidate high resolution pixel sets (step S41): a convolutional neural network module 35 performs a plurality of convolution operation on a high resolution frame ($t^{th}$ frame) by using different convolution kernels so as to generate a plurality of candidate high resolution pixel sets (serve as $t+1^{th}$ frame) respectively, and thereafter, is ready to perform generating selected high resolution pixel set step S42;

(2) generating selected high-resolution pixel set (step S42): continuing from step S41, in order to reduce the number of candidate frame of each of the candidate high resolution pixel sets ($t+1^{th}$ frame), the convolutional neural network module 35 again performs, with respect to a plurality of candidate high resolution pixel sets ($t+1^{th}$ frame), at least one convolution operation with a smaller convolution kernel (preferably a convolutional kernel of 1×1 pixels), so as to produce a selected high resolution pixel set (as $t+1^{th}$ frame). In a preferred embodiment, from the pixel sets perform with convolution operation conducted by the convolutional neural network module 35 on each of the candidate high-resolution pixel sets ($t+1^{th}$ frame), the image processing module 36 may firstly select the pixel set having a smaller pixel displacement quantity with the low-resolution frame ($t+1^{th}$ frame) to serve as aforementioned selected high resolution pixel set ($t+1^{th}$ frame), and it is then transmitted back to the convolutional neural network module 35, so that the convolutional neural network module 35 can continue to perform step S43: generating image fusion residual;

(3) generating image fusion residual value (step S43), and generating post-processing residual value (step S44): following the step S42, the convolutional neural network module 35 simultaneously performs convolution operation on the selected high resolution pixel set ($t+1^{th}$ frame) and the low resolution frame ($t+1^{th}$ frame), so as to generate an image fusion residual value ($t+1^{th}$ frame). Thereafter, in order to allow the image quality of the image fusion residual value ($t+1^{th}$ frame) to be fine-tuned and to increase capturing details of the image, the convolutional neural network module 35 continues to perform the processing residual value after generation step S44, i.e., the convolutional neural network module 35 performs one convolution operation on the image fusion residual value ($t+1^{th}$ frame) with same or different convolution kernel so as to generate a first post-processing residual value ($t+1^{th}$ frame). In turn, the convolution operation of the first post-processing residual value can be performed again so as to generate a second post-processing residual value and so on. Whereby, unnecessary image information can be filtered out from each of the post-processing residual values, and the details of the image can be extracted by the convolutional neural network learning mechanism. Thereafter, the convolutional neural network module 35 takes the final resulting post-processing residual value as a forward post-processing residual ($t+1^{th}$ frame) and an reverse post-processing residual ($t+2^{th}$ frame) and then transmitted it to the image processing module 36, so as to continue the execution of generating prediction high resolution frame step S45. In addition, taking aforementioned as example, the convolutional neural network module 35 may also take directly the image fusion residual value as the resulting post-processing residual value and transmit it to the image processing module 36, so as to continue the execution of generating a predicted high-resolution frame step S45;

(4) generating predicted high-resolution frame (step S45): continuing from S44, when the image processing module 36 receives the forward post-processing residual value ($t+1^{th}$ frame) and the reverse post-processing residual value ($t+2^{th}$ frame), the image processing module 36 in the forward prediction mode performs a pixel addition operation on the forward post-processing residual value ($t+1^{th}$ frame) and the low resolution frame ($t+1^{th}$ frame) so as to produce a forward prediction high resolution frame ($t+1^{th}$ frame); in the case of the reverse prediction mode, the image processing module 36 performs a pixel addition operation on the post-processing residual value (t+$2^{th}$ frame) and the low resolution frame (t+$2^{th}$ frame). And so on, the reverse prediction of the high-resolution frame (t+$2^{th}$ frame) can be used as a high-resolution frame (as the t+$2^{th}$ frame), and then performs abovementioned convolution operation with a low-resolution frame (t+$1^{th}$ frame) so as to produce a reverse prediction high-resolution frame (t+$1^{th}$ frame). Thereafter, the image processing module 36 transmits a forward prediction high-resolution frame (t+$1^{th}$ frame) and a reverse prediction high resolution frame (t+$1^{th}$ frame) of the same time point to a bi-directional prediction module 37, so as to continue the execution of generating super-resolution frame step S46;

(5) generating super-resolution frame (step S46): continuing from step S45, when the bi-directional prediction module 37 receives the forward prediction high resolution frame (t+$1^{th}$ frame) and the reverse prediction high resolution frame (t+$1^{th}$ frame) of the same time point, the bi-directional prediction module 37 hands these frames over to the convolutional neural network module 35 to performs at least one convolution operation so as to produce a super-resolution frame.

Figure 7:
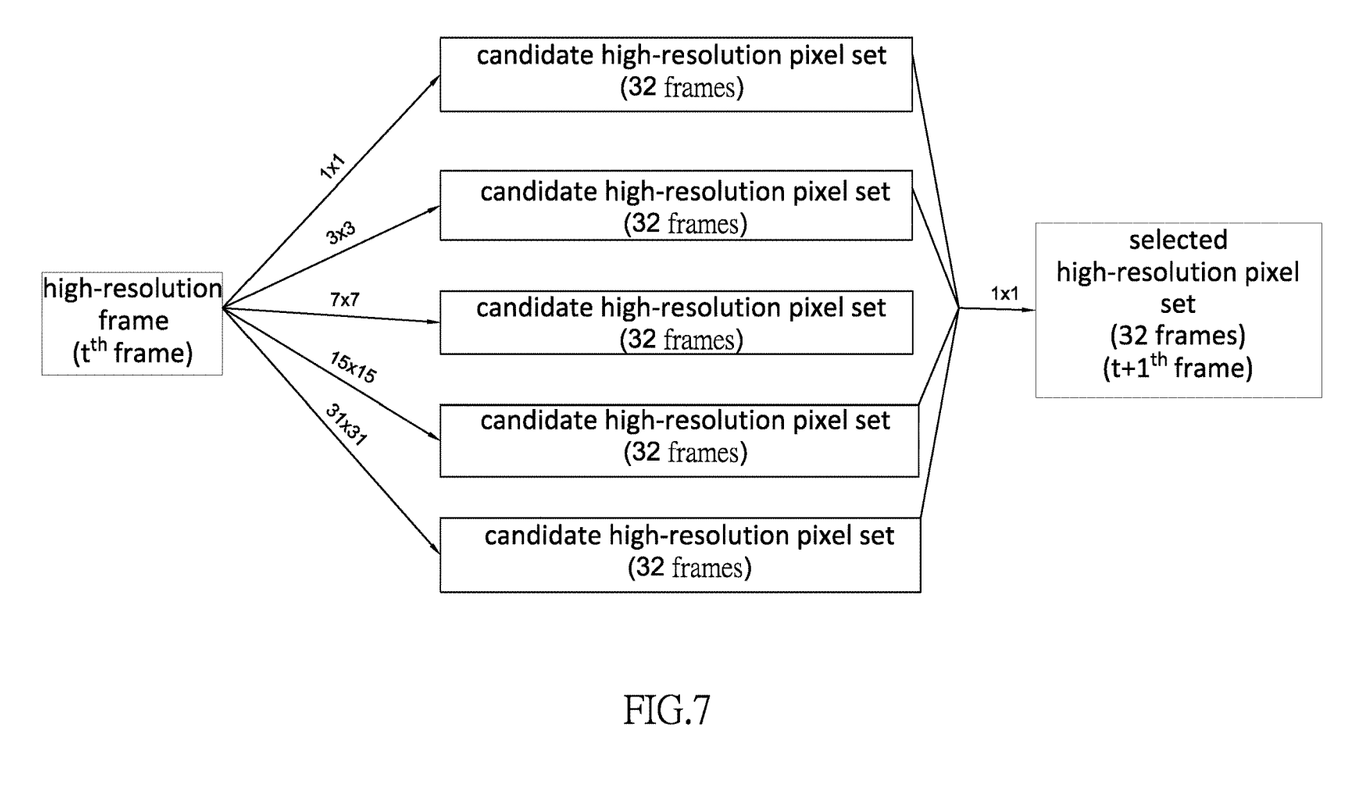
FIG. 7 is a schematic view of an embodiment of the present invention (1)

Referring to FIG. 7 is a schematic view showing the implementation of generating of a plurality of candidate high resolution pixel sets step S41. Referring to the figure, when an input layer 351 of the convolutional neural network module 35 inputs a high resolution frame (t$^{th}$ frame), the input layer 351 performs multiple convolution operations at different convolution kernels (e.g., 1×1 pixels, 3×3 pixels, 7×7 pixels, 15×15 pixels, or 31×31 pixels) respectively with the parameters stored in hidden layer 352 of the convolutional neural network module 35 as the basis, so as to calculate out a plurality of candidate high resolution pixel sets (as the t+$1^{th}$ frame). Thereafter, in order to reduce the number of candidate frames for each of the candidate high resolution pixel sets (t+$1^{th}$ frame), the input layer 351 of the convolutional neural network module 35 has to perform again a convolution operation on each of the candidate high resolution pixel sets (t+$1^{th}$ frame) with a smaller convolution kernel (preferably 1×1), so as to calculate out a selected high resolution pixel set (t+$1^{th}$ frame). Further, the number of frames of each of the candidate high-resolution pixel sets and the selected high-resolution pixel set may not be only one or can be more than one (For example, all can be 32). In other words, a selected high-resolution pixel set containing 32 frames shown in the figure is filtered out from a candidate high resolution pixel set (t+$1^{th}$ frame) containing total 160 frames. In the preferred embodiment, the output layer 353 of the convolutional neural network module 35 can transmit the pixel set (i.e., selected high-resolution pixel set containing 32 frames) generated after convolution operation of each of candidate high-resolution pixel sets (t+$1^{th}$ frame) to a displacement calculation unit 361, so that the displacement calculation unit 361 can select out the pixel set having a smaller pixel displacement quantity with the low-resolution frame (t+$1^{th}$ frame) to serve as selected high resolution pixel set (t+$1^{th}$ frame) through two-times selection, and it is then transmitted back to the convolutional neural network module 35, so that the convolutional neural network module 35 can continue to perform the generating image fusion residual step S43 and the processing of residual value after generation step S44. The comparison mechanism of pixel displacement can be the first 10 frames, the first 15 frames, or the first 20 frames, etc. of the lowest pixel offset, but it is not limited to this. Also, if this stage is a forward prediction mode, then the selected high-resolution pixel set generated by multiple convolution operation on the high-resolution frame (t$^{th}$ frame) with different convolution kernels is t+$1^{th}$ frame; on the other hand, if it is in the reverse prediction mode, a high-resolution frame (t+3), then the selected high-resolution pixel set generated by multiple convolution operation on high-resolution frame (t+$3^{th}$ frame) with different convolution kernels is t+$2^{th}$ frame, and so on.

Figure 8:
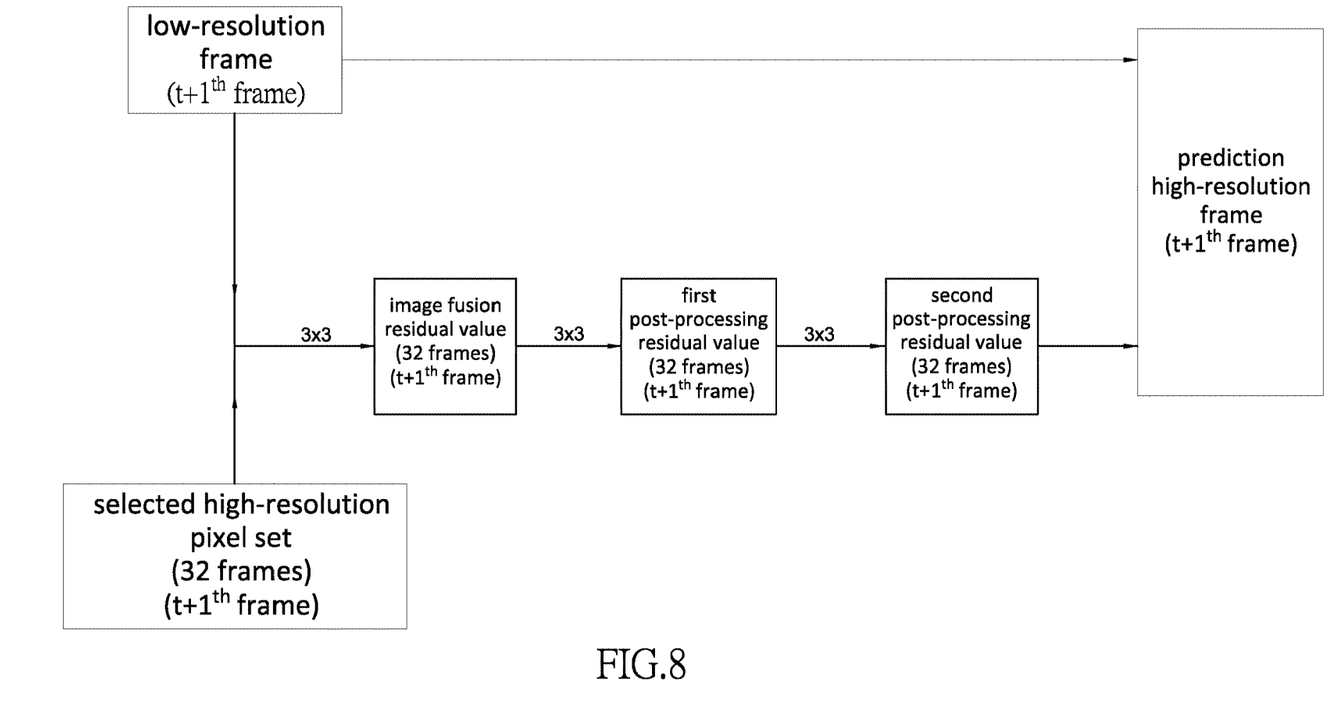
FIG. 8 is a schematic view of an embodiment of the present invention (2)

FIG. 8 is a schematic view showing the implementation of generating image fusion residual value step S43 and generating post-processing residual value step S44. In the case of forward prediction mode, the input layer 351 of the convolutional neural network module 35 may input a selected high resolution pixel set (t+$1^{th}$ frame) and a low resolution frame (t+$1^{th}$ frame), and a convolution operation is performed using a convolution kernel based on the parameters stored in the hidden layer 352, and an image fusion residual value (t+$1^{th}$ frame) is calculated out. Thereafter, in order to allow the image quality of the image fusion residual value (t+$1^{th}$ frame) to be fine-tuned and to increase capturing details of the image, the input layer 351 can again perform one convolution operation on the image fusion residual value (t+$1^{th}$ frame) with same or different convolution kernel, so as to calculate out a first post-processing residual value (t+$1^{th}$ frame). Thereafter, the input layer 351 can again perform one convolution operation on the first post-processing residual value (t+$1^{th}$ frame) with same or different convolution kernel, so as to calculate out a second post-processing residual value (t+$1^{th}$ frame), and so on. Thereafter, the output layer 353 of the convolutional neural network module 35 takes the final resulting post-processing residual value (t+$1^{th}$ frame) as a forward post-processing residual (t+$1^{th}$ frame). Thereafter, the convolutional neural network module 35 allows the pixel addition unit 362 to perform a generating prediction high resolution frame step S45, that is, the pixel addition unit 362 conducts a pixel addition operation on the forward post-processing residual value (t+$1^{th}$ frame) and the low resolution frame (t+$1^{th}$ frame), so as to generate a forward prediction high resolution frame (t+$1^{th}$ frame). On the other hand, in the case of reverse prediction mode, a low-resolution frame (t+$2^{th}$ frame) and a selected high resolution pixel set (t+$2^{th}$ frame) can be input into the input layer 351 of the convolutional neural network module 35, which conducts a convolution operation with an image filter unit as convolution kernel and with parameters stored in the hidden layer 352 as basis to calculate out an image fusion residual value (t+$2^{th}$ frame). Thereafter, in order to allow the image fusion residual value (t+$2^{th}$ frame) to be fine-tuned and to increase capturing details of the image, the input layer 351 can again perform one convolution operation on the image fusion residual value (t+$2^{th}$ frame) with same or different pixel filter unit, so as to calculate out a first post-processing residual value (t+$2^{th}$ frame). Thereafter, the input layer 351 can again perform one convolution operation on the first post-processing residual value (t+$2^{th}$ frame) so as to calculate out a second post-processing residual value (t+$2^{th}$ frame), and so on, and the last post-processing residual value in final stage is served as the reverse post-processing residual value (t+$2^{th}$ frame). Thereafter, the pixel addition unit 362 conducts a pixel addition operation on the reverse post-processing residual value (t+$2^{th}$ frame) and the low resolution frame (t+$2^{th}$ frame) so as to generate a reverse prediction high-resolution frame (t+$2^{th}$ frame). In addition, either in forward or reverse prediction mode, in the preferred embodiment, the input layer 351 may perform a convolution operation on the second post-processing residual value so as to generate a third post-processing residual value, and the third post-processing residual value is employed as the forward of reverse post-processing residual value. It is especially to be claimed hereby that the number of convolution operations conducted by the convolutional neural network module 35 on the aforementioned post-processing residual value should be limited to three times at most, that is, the input layer 351 can generate a fourth post-processing residual value, and a fifth post-processing Residual value, etc., and the input layer 351 can filter out more unnecessary image noise and then increase the peak signal to noise ratio (PSNR) values, if each time the same convolution kernel is employed in the convolution operation (for example, maintain 3×3). Finally, the pixel addition unit 362 again transmits a forward prediction high resolution frame and a reverse prediction high resolution picture frame of the same time point to a bi-directional prediction module 37, so as to continue the execution of step S46: generating super-resolution frame. The convolutional neural network module 35 can directly use the image fusion residual as the final post-processing residual value, no matter whether it is forward or reverse prediction.

Figure 9:
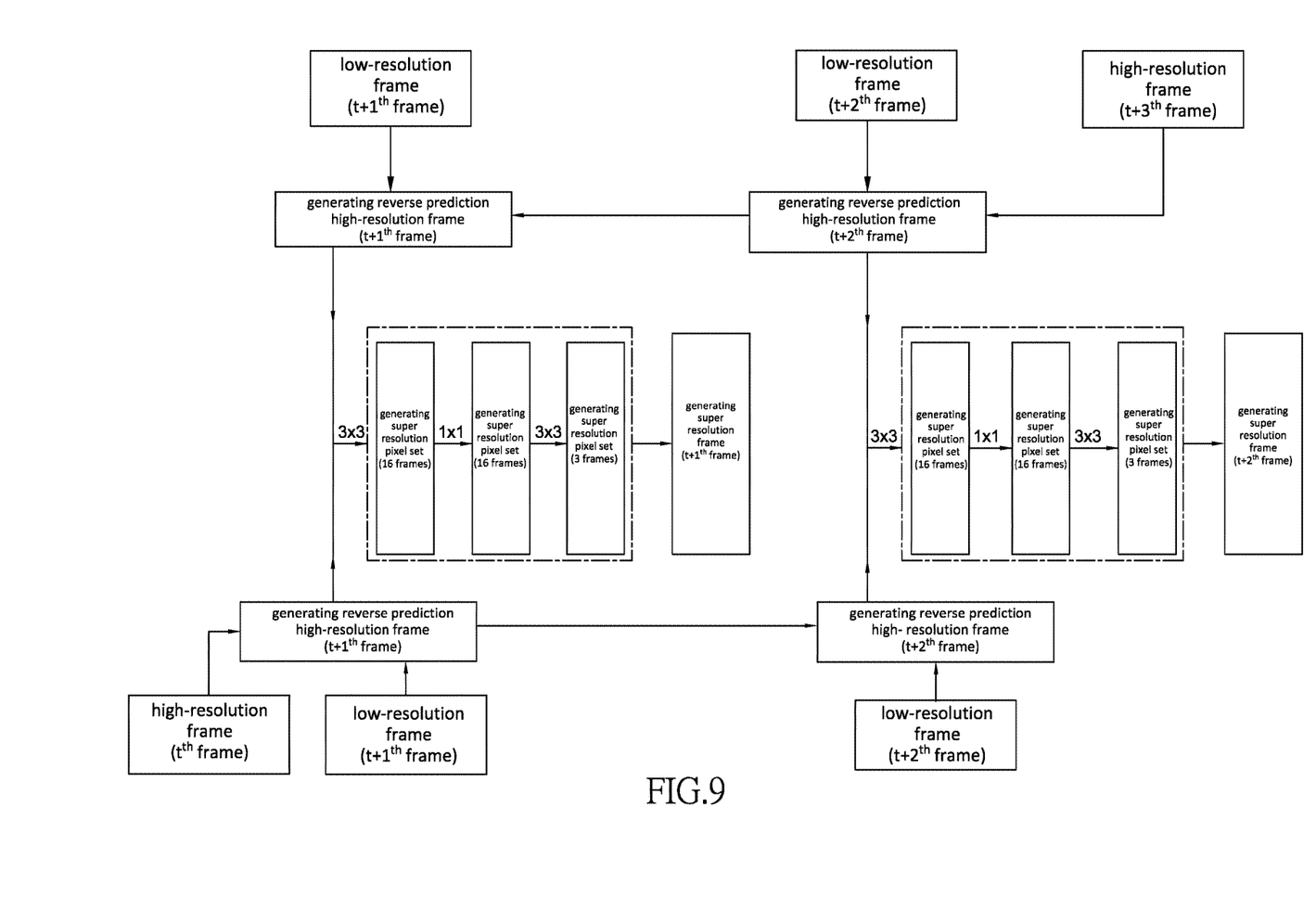
FIG. 9 is a schematic view of an embodiment of the present invention (3)

Referring to FIG. 9, when the step S46: generating super-resolution frame is to be implemented, the bi-directional prediction module 37 firstly receives a forward prediction high-resolution frame (t+1$^{th}$ frame) and a reverse prediction high-resolution frame (t+1$^{th}$ frame) of the same time point, and input these frames to the input layer 351 of the convolutional neural network module 35 simultaneously, and then a convolution kernel is employed to carry out multiple convolution operations sequentially. Finally, a super-resolution frame (t+1$^{th}$ frame) can be generated. During the convolution operation, the input layer 351 successively employs different and smaller convolution kernels (e.g., 1×1, or 3×3) to perform convolution operation and generates a plurality of super-resolution pixel sets to obtain better pixel filtering effect. In the preferred embodiment, if the final super-resolution frame is RGB frame, then three different super resolution pixel set (containing three frames) corresponding to R (red), G (green), B (blue) are finally generated after multiple convolution operations are performed. After the frames corresponding to R, G, B color frequency are superposed together, a super-resolution frame can be output. If the final output of the super-resolution frame is for the CMYK frame, then the super-resolution pixel set (containing 4 frames) corresponding to C (green), M (magenta), Y (yellow), K (black) color frequency are finally generated after multiple convolution operations are performed, and the frames corresponding to C, M, Y, K color frequency are superposed together, so a super-resolution frame can be output. If the final output of the super-resolution frame is for the YUV frame, the super-resolution pixel set (containing 3 frames) corresponding to Y (brightness), U (color component), V (color component) three color levels can be finally generated after multiple convolution operations are performed, and the frames corresponding to Y, U, V are superposed together, so a super-resolution frame can be output. When the convolution operation is performed in bi-directional prediction mode, the problem of time domain redundancy produced during switching from high-resolution frame (t$^{th}$ frame) to low-resolution frame (t+1$^{th}$ frame), or during switching from high-resolution frame (t+3$^{th}$ frame) to low-resolution frame (t+2$^{th}$ frame), or during offset of pixels of two adjacent frames can be improved.

Figure 10:
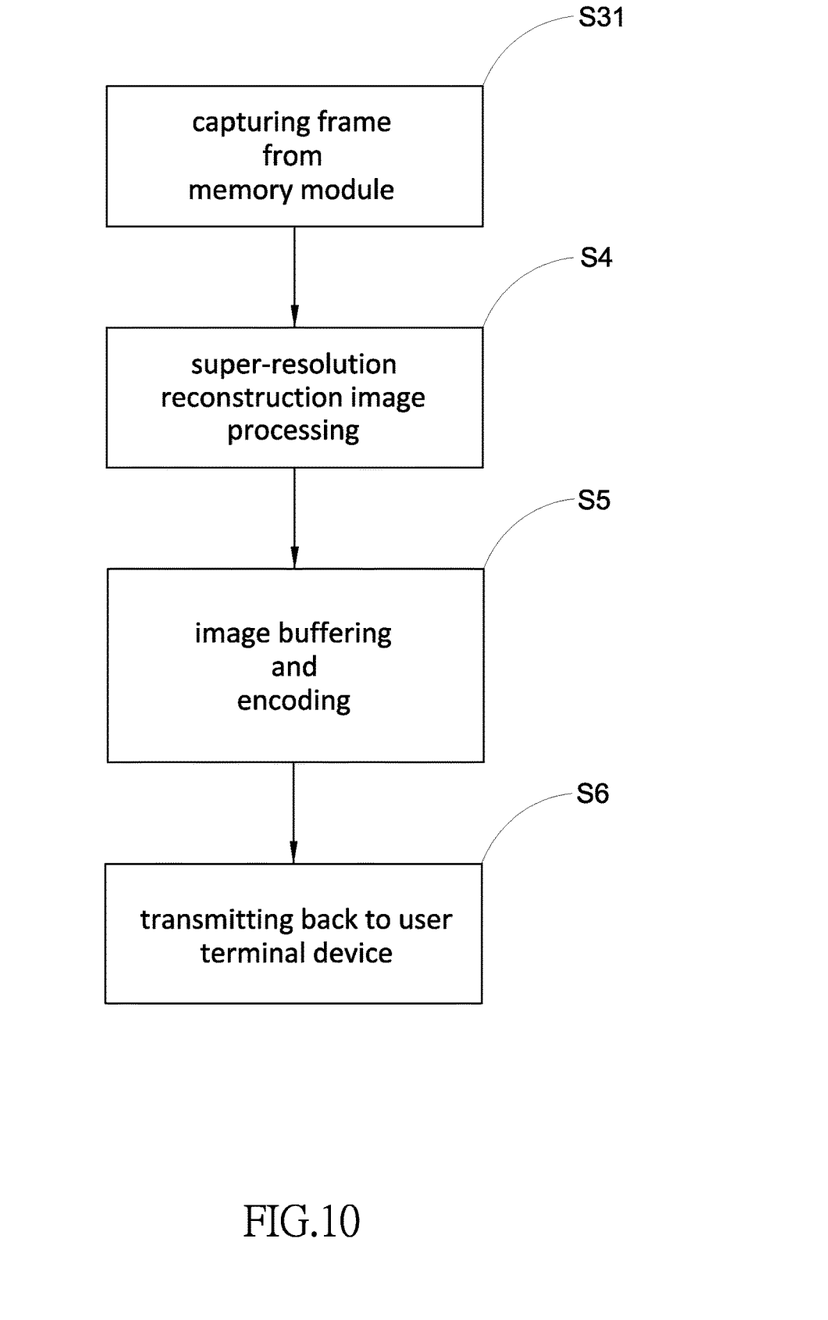
FIG. 10 is an implementation flow chart of another embodiment of the present invention.

Referring to FIG. 10, if monitoring end wants to view non-concurrent monitored image from user terminal device 40, the system 30 for providing high resolution image through super-resolution reconstruction can be used to perform the following steps: a frame buffer 33 performs the step S31 of capturing frame from the memory module, i.e., the frame buffer 33 firstly captures a plurality of decoded high-resolution frames and decoded low-resolution frames, and transmits these frames to the convolutional neural network module 35 so as to continue to perform the super-resolution reconstruction image processing step S4. Also, the frame buffer 33 may capture a plurality of un-decoded packets from the storage module 34. After these packets are decoded by the image decoder 32, the frame buffer 33 further transmits these packets to the convolutional neural network module 35, the image processing module 36, and bi-directional prediction module 37 to calculate out a super-resolution frame. Thereafter, the frame is temporarily stored in the frame buffer 33 for buffering and is then transmitted to the image encoder 38 for encoding. After encoding, the frame is transmitted to the streaming buffer 31 for streaming buffering. After the abovementioned image buffering and encoding step are completed, the second transmission module 39 performs the transmitting back to user terminal step S6, i.e., transmits the super-resolution frames to user terminal device 40 for monitor end to view non-concurrent image.

While the present invention has been described by preferred embodiments in conjunction with accompanying drawings, it should be understood that the embodiments and the drawings are merely for descriptive and illustrative purpose, not intended for restriction of the scope of the present invention. Equivalent variations and modifications performed by person skilled in the art without departing from the spirit and scope of the present invention should be considered to be still within the scope of the present invention.

The invention claimed is:

1. An implementation method for providing high resolution image through super-resolution reconstruction, comprising the following steps:

Capturing image step: capturing a plurality of high-resolution frames and a plurality of low-resolution frames by an image capturing device;

Generating candidate pixel set and selecting pixel set step: a convolutional neural network module performs multiple convolution operations on said high-resolution frame so as to calculate out a plurality of candidate high-resolution pixel sets; thereafter, at least one said convolution operation is conducted simultaneously on each of said candidate high-resolution pixel sets so as to generate a selected high-resolution pixel set;

Generating post-processing residual value step: said convolutional neural network module performs at least one said convolution operation on said selected high-resolution pixel set and said low-resolution frame, so as to generate a post-processing residual value;

Generating prediction high-resolution frame step: a pixel addition unit performs a pixel addition operation on said post-processing residual value and said low-resolution frame so as to calculate out a forward prediction high-resolution frame and a reverse prediction high-resolution frame of the same time point; and Generating super-resolution frame step: after a bi-directional prediction module receives said forward prediction high-resolution frame and said reverse prediction high-resolution frame, said convolutional neural network module performs at least one said convolution operation on said forward prediction high-resolution frame and said reverse prediction high-resolution frame, so as to generate a super-resolution frame.

2. The implementation method for providing high resolution image through super-resolution reconstruction as claimed in claim 1, after one said high-resolution frame and one said low-resolution frame of next time point are performed with said generating candidate pixel set and selecting pixel set step, said generating post-processing residual value step, and said generating prediction high-resolution frame step sequentially, said forward prediction high-resolution frame is generated thereon.

3. The implementation method for providing high resolution image through super-resolution reconstruction as claimed in claim 1, after one said high-resolution frame and one said low-resolution frame of last time point are performed with said generating candidate pixel set and selecting pixel set step, said generating post-processing residual value step, and said generating prediction high-resolution frame step sequentially, said reverse prediction high-resolution frame is generated thereon.

4. The implementation method for providing high resolution image through super-resolution reconstruction as claimed in claim 1, after said convolutional neural network module performs at least one said convolution operation on each of said candidate high-resolution pixel sets, a displacement calculation unit firstly from the operation result of said convolution operation filters out the pixel set having a smaller pixel displacement quantity with said low-resolution frame to serve as said selected high-resolution pixel set.

5. The implementation method for providing high resolution image through super-resolution reconstruction as claimed in claim 1, wherein the frames per second of a plurality of said high-resolution frames captured by said image capturing device is lower than or equal to that of said low-resolution frames.

6. The implementation method for providing high resolution image through super-resolution reconstruction as claimed in claim 1, wherein said image capturing device determines the quantity of continuously captured frame by the number of samples, and at least one high-resolution frame is present in the captured frames.

7. The implementation method for providing high resolution image through super-resolution reconstruction as claimed in claim 1, wherein said convolutional neural network module has an input layer, a hidden layer and an output layer, said input layer is employed to input the frame or the residual value to be conducted with convolution operation, said hidden layer is employed to store a plurality of parameters for determining which convolution kernel to be used in said convolution operation, said output layer is used to output the operation result of said convolution operation.

8. The implementation method for providing high resolution image through super-resolution reconstruction as claimed in claim 7, wherein said plurality of parameters determine said different convolution kernel which said input layer can use to perform multiple said convolution operation on said high-resolution frame separately, so as to calculate out said plurality of candidate high-resolution pixel sets, and said input layer can employ again said convolution kernel with 1×1 pixel to perform one said convolution operation on said each of said candidate high-resolution pixel sets simultaneously, so as to calculate out said selected high-resolution pixel set.

9. The implementation method for providing high resolution image through super-resolution reconstruction as claimed in claim 7, wherein said plurality of parameters determine said convolution kernel which said input layer can use to perform one said convolution operation on said selected high-resolution pixel set and said low-resolution frame simultaneously, so as to calculate out an image fusion residual value.

10. The implementation method for providing high resolution image through super-resolution reconstruction as claimed in claim 9, wherein said plurality of parameters are in such a manner that said input layer can perform one said convolution operation on said image fusion residual value so as to generate a first post-processing residual value; thereafter, said input layer can perform multiple said convolution operation sequentially on said first post-processing residual value, and the last resulting post-processing residual value is served as said post-processing residual value.

11. The implementation method for providing high resolution image through super-resolution reconstruction as claimed in claim 7, wherein said plurality of parameters are in such a manner that said input layer can perform at least one said convolution operation on said forward prediction high-resolution frame and said reverse prediction high-resolution frame so as to calculate out said super-resolution frame respectively corresponding to R, G, B color frequency signals, or calculate out said super-resolution frame respectively corresponding to C, M, Y, K color frequency signals, or calculate out said super-resolution frame respectively corresponding to Y, U, V color frequency signals.

12. The implementation method for providing high resolution image through super-resolution reconstruction as claimed in claim 1, wherein a memory module is separately in data linking with a frame buffer and a streaming buffer so as to store each of said decoded high-resolution frames and each of said decoded low-resolution frames, and store undecoded plural packets, each of said packets is decoded to generate each of said high-resolution frames and each of said low-resolution frames.

13. A system for providing high resolution image through super-resolution reconstruction, which can be in data linking with an image capturing device to obtain a plurality of high-resolution frames and a plurality of low-resolution frames captured by said image capturing device so as to allow viewing a monitored image through an user terminal device after data linking, said system comprising:

a frame buffer for receiving, temporarily storing one said high-resolution frame, one said low-resolution frame and a super-resolution frame;

a convolutional neural network module in data linking with said frame buffer to perform multiple convolution operations on said high-resolution frame, so as to generate a plurality of candidate high-resolution pixel sets; and to perform at least one said convolution operation on said plurality of candidate high-resolution pixel sets so as to generate a selected high-resolution pixel set; and to perform at least one said convolution operation on said selected high-resolution pixel set and said low-resolution frame simultaneously so as to generate a post-processing residual value;

an image processing module in data linking with said convolutional neural network module, said image processing module has an image addition unit for performing image addition operation on said post-processing residual value and said low-resolution frame so as to generate a forward prediction high-resolution frame and a reverse prediction high-resolution frame of the same time point;

a bi-directional prediction module in data linking with said convolutional neural network module for receiving said forward prediction high-resolution frame and said reverse prediction high-resolution frame, and then transmitting these frames to said convolutional neural network module to perform said convolution operation so as to generate said super-resolution frame.

14. The system for providing high resolution image through super-resolution reconstruction as claimed in claim 13, after one said high-resolution frame and one said low-resolution frame of next time point are performed with multiple said convolution operation by said convolutional neural network module and said pixel addition operation by said image processing module sequentially, said forward prediction high-resolution frame is generated thereon.

15. The system for providing high resolution image through super-resolution reconstruction as claimed in claim 13, after one said high-resolution frame and one said low-resolution frame of last time point are performed with multiple said convolution operation by said convolutional neural network module and said pixel addition operation by said image processing module sequentially, said reverse prediction high-resolution frame is generated thereon.

16. The system for providing high resolution image through super-resolution reconstruction as claimed in claim 13, wherein said image processing module has a displacement calculation unit, with respect to the result obtained from said convolution operation conducted on said plurality of high-resolution pixel set, said displacement calculation unit firstly conducts a pixel displacement quantity calculation and then selects out the pixel set having a smaller pixel displacement quantity with said low-resolution frame to serve as said selected high-resolution pixel set.

17. The system for providing high resolution image through super-resolution reconstruction as claimed in claim 13, wherein the frames per second of a plurality of said high-resolution frames captured by said image capturing device is lower than or equal to that of said low-resolution frames.

18. The system for providing high resolution image through super-resolution reconstruction as claimed in claim 13, wherein said image capturing device determines the quantity of continuously captured frame with number of samples, and at least one high-resolution frame is present in the captured frames.

19. The system for providing high resolution image through super-resolution reconstruction as claimed in claim 13, wherein said convolutional neural network module has an input layer, a hidden layer and an output layer, said input layer is employed to input the frame or the residual value to be conducted with convolution operation, said hidden layer is employed to store a plurality of parameters for determining which convolution kernel to be used in said convolution operation, said output layer is used to output the operation result of said convolution operation.

20. The system for providing high resolution image through super-resolution reconstruction as claimed in claim 19, wherein said plurality of parameters determine said different convolution kernel which said input layer can use to perform multiple said convolution operation on said high-resolution frame separately, so as to calculate out said plurality of candidate high-resolution pixel sets, and said input layer can employ again said convolution kernel with 1×1 pixel to perform one said convolution operation on each of said candidate high-resolution pixel sets simultaneously, so as to calculate out said selected high-resolution pixel set.

21. The system for providing high resolution image through super-resolution reconstruction as claimed in claim 19, wherein said plurality of parameters are in such a manner that said input layer can perform one said convolution operation on said image fusion residual value so as to generate a first post-processing residual value; thereafter, said input layer can perform multiple said convolution operations sequentially on said first post-processing residual value, and the last resulting post-processing residual value is served as said post-processing residual value.

22. The system for providing high resolution image through super-resolution reconstruction as claimed in claim 19, wherein said plurality of parameters are in such a manner that said input layer can perform at least one said convolution operation on said forward prediction high-resolution frame and said reverse prediction high-resolution frame so as to calculate out said super-resolution frame respectively corresponding to R, G; B color frequency signals, or calculate out said super-resolution frame respectively corresponding to C, M, Y, K color frequency signals, or calculate out said super-resolution frame respectively corresponding to Y, U, V color frequency signals.

23. The system for providing high resolution image through super-resolution reconstruction as claimed in claim 13, wherein a memory module is separately in data linking with a frame buffer and a streaming buffer so as to store each of said decoded high-resolution frames and each of said decoded low-resolution frames, and store un-decoded plural packets, each of said packets is decoded to generate each of said high-resolution frames and each of said low-resolution frames.

\* \* \* \* \*